(12) United States Patent
Newman

(10) Patent No.: US 7,416,659 B2
(45) Date of Patent: Aug. 26, 2008

(54) FILTER APPARATUS WITH FLUID BYPASS

(75) Inventor: Daniel A. Newman, Salem, VA (US)

(73) Assignee: Tetra Holding (US), Inc., Blacksburg, VA (US)

(*) Notice: Subject to any disclaimer, the term of this patent is extended or adjusted under 35 U.S.C. 154(b) by 0 days.

(21) Appl. No.: 11/455,336

(22) Filed: Jun. 19, 2006

(65) Prior Publication Data
US 2007/0023338 A1 Feb. 1, 2007

Related U.S. Application Data

(60) Provisional application No. 60/704,812, filed on Aug. 1, 2005.

(51) Int. Cl.
*A01K 63/04* (2006.01)
*B01D 35/027* (2006.01)

(52) U.S. Cl. .............. 210/167.27; 210/416.2; 119/259

(58) Field of Classification Search ............ 210/167.21, 210/167.27, 416.1, 416.2; 119/259, 262
See application file for complete search history.

(56) References Cited

U.S. PATENT DOCUMENTS

| | | | | |
|---|---|---|---|---|
| 3,468,288 A | * | 9/1969 | Cassil | 119/262 |
| 3,669,297 A | * | 6/1972 | Willinger | 210/94 |
| 3,687,291 A | * | 8/1972 | Willinger | 210/167.23 |
| 3,738,494 A | | 6/1973 | Willinger et al. | |
| 4,039,453 A | * | 8/1977 | Horvath | 210/167.25 |
| 4,392,953 A | * | 7/1983 | Cornelius et al. | 210/167.27 |
| 5,002,660 A | * | 3/1991 | Sherman et al. | 210/167.27 |
| 5,053,125 A | | 10/1991 | Willinger et al. | |
| 5,139,659 A | * | 8/1992 | Scott | 210/167.26 |
| 5,160,607 A | * | 11/1992 | Thiemer et al. | 210/128 |
| 5,242,582 A | * | 9/1993 | Marioni | 210/151 |
| 5,567,315 A | * | 10/1996 | Weidenmann et al. | 210/123 |
| 6,692,637 B2 | | 2/2004 | Fox et al. | |
| 6,712,690 B1 | * | 3/2004 | Wipf | 454/285 |
| 2005/0194326 A1 | * | 9/2005 | Calabrese | 210/798 |

OTHER PUBLICATIONS

Exhibt A Doctors Foster & Smith, *Aquarium Outfitters*, 4 pgs, (Date: Admitted Prior Art), exact date unknown.
Exhibt B Instructions 2206, 8 pgs, (Date: Admitted Prior Art), exact date unknown.
Exhibit C Marineland®, *Instructions Duetto Mini Submersible Power Filter*, 1 pg, (Date: Admitted Prior Art), exact date unknown.
Exhibit D Marineland, *Duetto 50 Submersible Power Filter*, 10 pgs, (Date: Admitted Prior Art), exact date unknown.
Exhibit E Zoo Med, *Micro Clean 304 Internal Mini-Filter*, 8 pgs, (Date: Admitted Prior Art), exact date unknown.
Exhibit F hydor®, *Thermofilter EKIP 250*, 7 pgs., (Date: Admitted Prior Art), exact date unknown.
Exhibit G Tetra*tec*® 200-400 1/h, *Komfort Aquarium Innenfilter IN400 plus*, 4 pgs., (Date: Admitted Prior Art), exact date unknown.

(Continued)

*Primary Examiner*—Fred Prince
(74) *Attorney, Agent, or Firm*—Merchant & Gould P.C.

(57) ABSTRACT

A filter arrangement for filtration of a primary fluid, the filter arrangement having a filtration region and a bypass region. The bypass region is a sealed region containing a secondary fluid having a specific gravity different than a specific gravity of the primary fluid. The bypass region providing a bypass pathway for flow of the primary fluid during extended use of a clogged filter cartridge.

22 Claims, 8 Drawing Sheets

OTHER PUBLICATIONS

Exhibit H FLUVAL®, *Underwater Filter Iplus*, 4 pgs., (Date: Admitted Prior Art), exact date unknown.

Exhibit I hydor®, *Filter ITPF 3*, 4 pgs., (Date: Admitted Prior Art), exact date unknown.

* cited by examiner

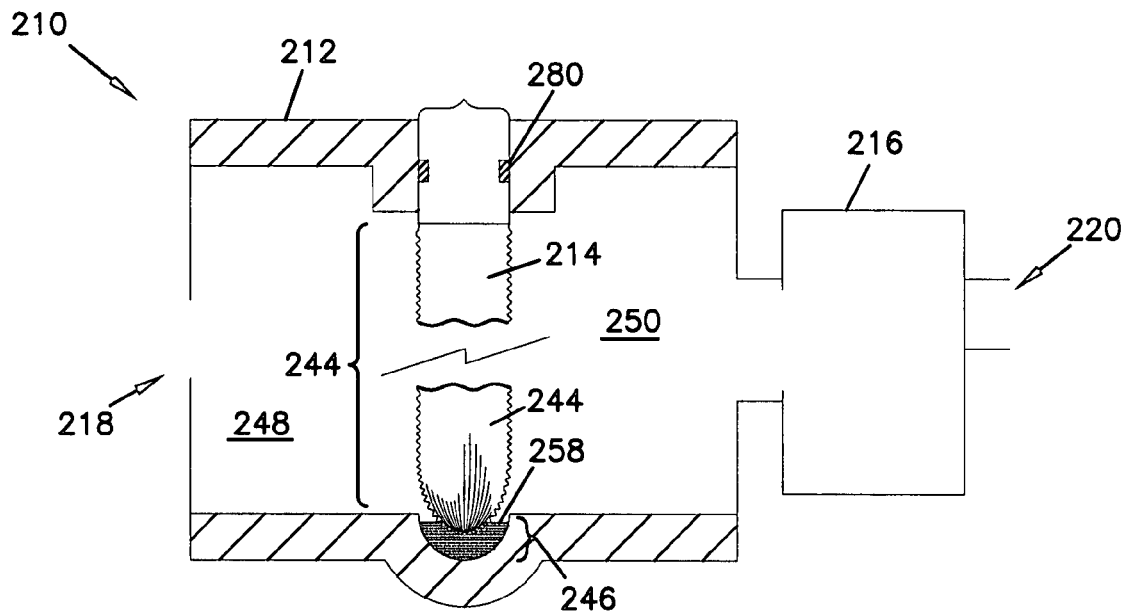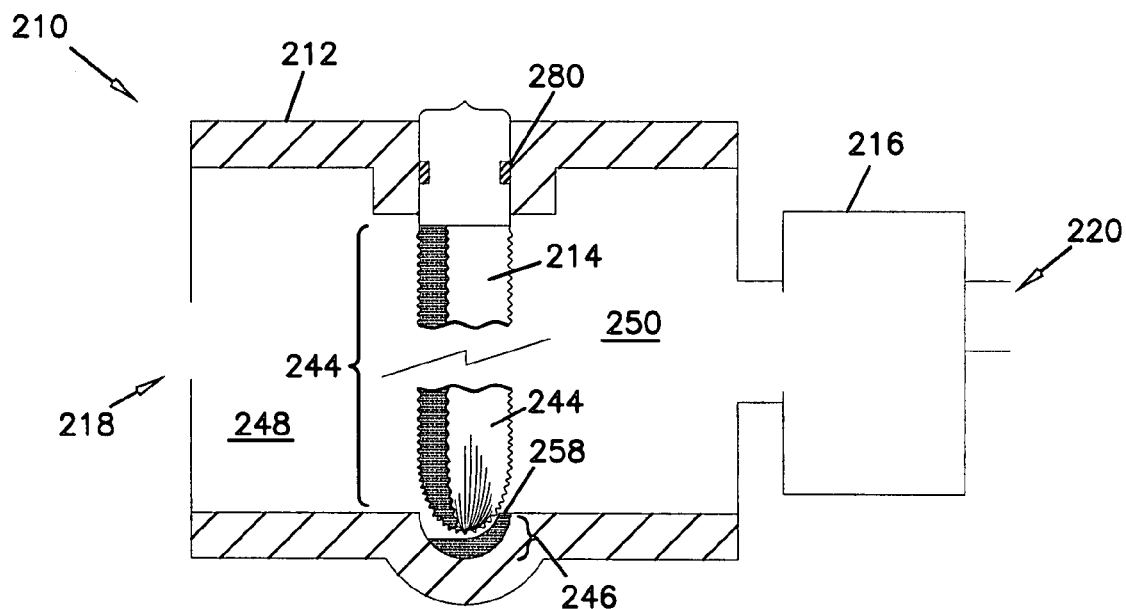

FILTER APPARATUS WITH FLUID BYPASS

CROSS-REFERENCE TO RELATED APPLICATIONS

This application claims the benefit of U.S. Provisional Application No. 60/704,812, filed on Aug. 1, 2005; which application is incorporated herein by reference.

TECHNICAL FIELD

This disclosure relates generally to methods and devices for filtering water. More particularly, this disclosure relates to a filter having a fluid bypass arrangement.

BACKGROUND

To maintain an ecological balance within an aquarium, it is necessary to clean the aquarium water. Cleaning is often accomplished by pumping water from the aquarium to a filter device, filtering the water through a filter medium, and returning the filtered water to the aquarium. As aquarium water passes through the filter media, various particulates trapped by the media can gradually slow or block the passage of water through the media. Thus, it is necessary for the user to periodically remove and replace the filter media.

In some conventional arrangements, the filter device is fully submerged. When the filter media of a fully submerged filter device clogs, circulation of water through the filter device can become highly restricted. That is, only a restricted amount of filtered water can pass through the blocked or clogged filter media, causing strain on the pump and reducing overall water quality by restricting water circulation within the aquarium.

Because the filter media of most filter devices is hidden from view, the user can be unaware that the filter media is clogged. Extended use of clogged filter media can eventually lead to pump damage or excessive component wear. In some arrangements, clogged filter media also results in poor water circulation. In general, improvement has been sought with respect to such filter devices, generally to prevent pump component damage and improve water quality during clogged filter media use.

SUMMARY

One aspect of the present disclosure relates to a filter arrangement for filtration of a primary fluid. The filter arrangement includes a filtration region and a bypass region. The bypass region contains a secondary fluid having a specific gravity that is different than the specific gravity of the primary fluid. The bypass region provides a controlled bypass pathway through which the primary fluid may flow during extended use of clogged or blocked filter media.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 9 is a schematic representation of an alternative embodiment of a filter arrangement, according to the principles of the present disclosure, and showing operation of the filter arrangement with an unclogged filter cartridge; and FIG. 10 is a schematic representation of the filter arrangement of FIG. 9, showing operation of the filter arrangement with a clogged filter cartridge.

DETAILED DESCRIPTION

Reference will now be made in detail to various features of the present disclosure that are illustrated in the accompanying drawings. Wherever possible, the same reference numbers will be used throughout the drawings to refer to the same or like parts.

FIGS. 1-10 illustrate embodiments of filter arrangements having features that are examples of how inventive aspects in accordance with the principles of the present disclosure may be practiced. Preferred features are adapted for improving the overall water quality in an aquarium during extended use of a clogged filter cartridge, and preventing filter component wear or damage. Other preferred features are adapted for accommodating ease of use of the filtration device by indicating to the user that filter cartridge maintenance is required.

Figure 4:
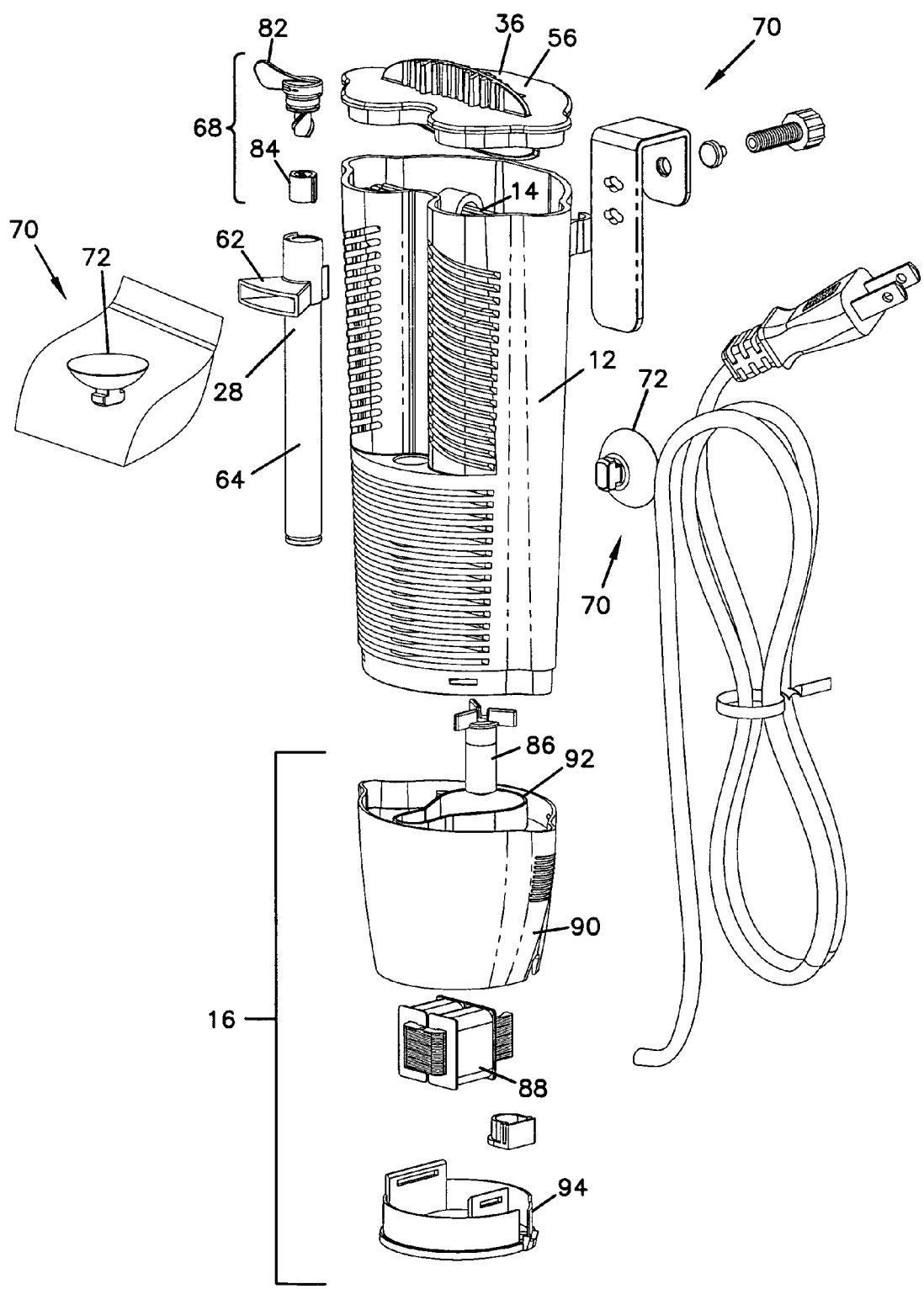
FIG. 4 is an exploded perspective view of the filter arrangement of FIG. 1.
Figure 5:
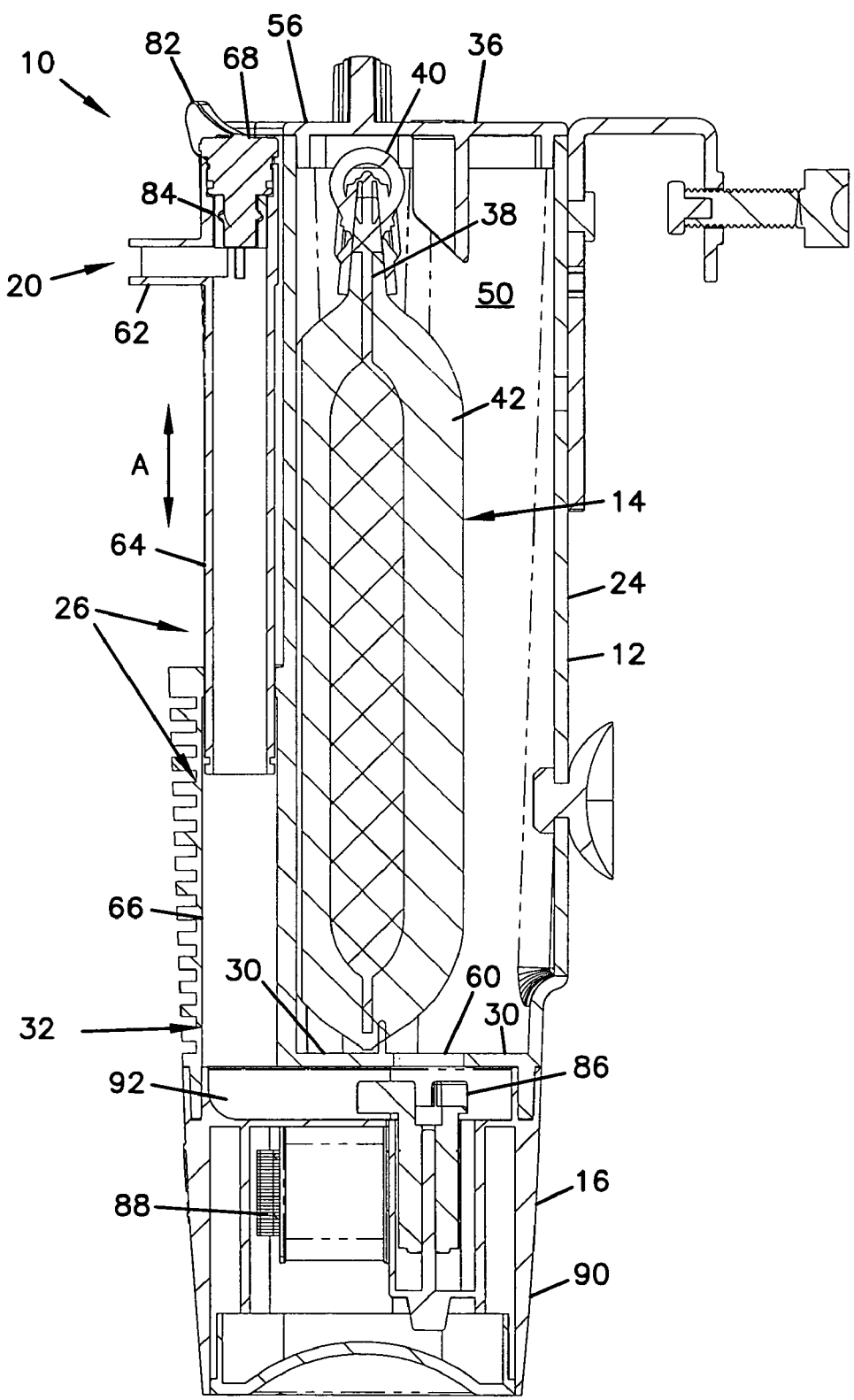
FIG. 5 is a cross-sectional view of the filter arrangement of FIG. 3, taken along line 5-5.
Figure 6:
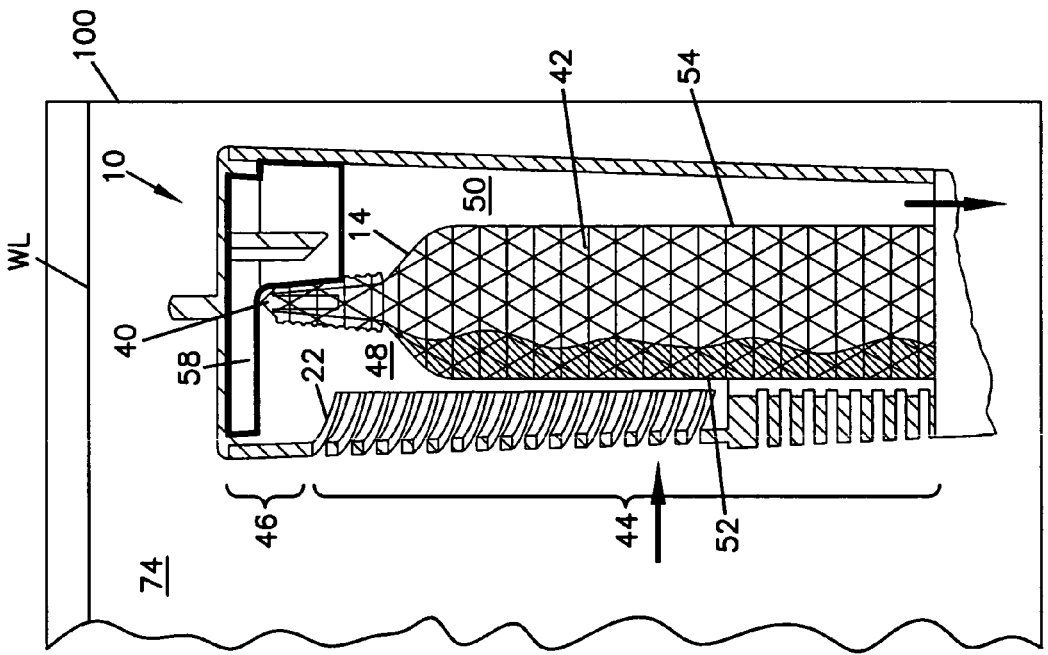
FIG. 6 is a schematic representation of the filter arrangement of FIG. 1, showing operation of the filter arrangement with an unclogged filter cartridge in one method of use.

Referring to FIGS. 1-10, the filter arrangements 10, 210 disclosed are for general use with an aquarium 100 (FIG. 6). General use with an aquarium is intended to include use in tanks solely containing fish, or use in tanks containing reptiles or amphibians, for example. It is further contemplated that the present filter arrangement 10, 210 can also be use in a pond or other body of fluid requiring filtration.

Referring now to FIGS. 1-5, a first embodiment of the filter arrangement 10 is illustrated. The filter arrangement 10 includes a filter housing 12 and a filter cartridge 14 (FIG. 5) positionable within the filter housing 12. During operation, a pump assembly 16 draws aquarium water into the filter housing 12, through the filter cartridge 14, and then directs the filtered water back into the primary volume of the aquarium 100. The pump assembly 16 is a submersible pump assembly generally including an impeller 86 (FIG. 4) and a motor 88. The impeller 86 and motor 88 are contained within a pump housing 90. One end of the pump housing 90 interconnects to the filter housing 12. An end cap 94 is located at the other end of the pump housing 90.

Figure 1:
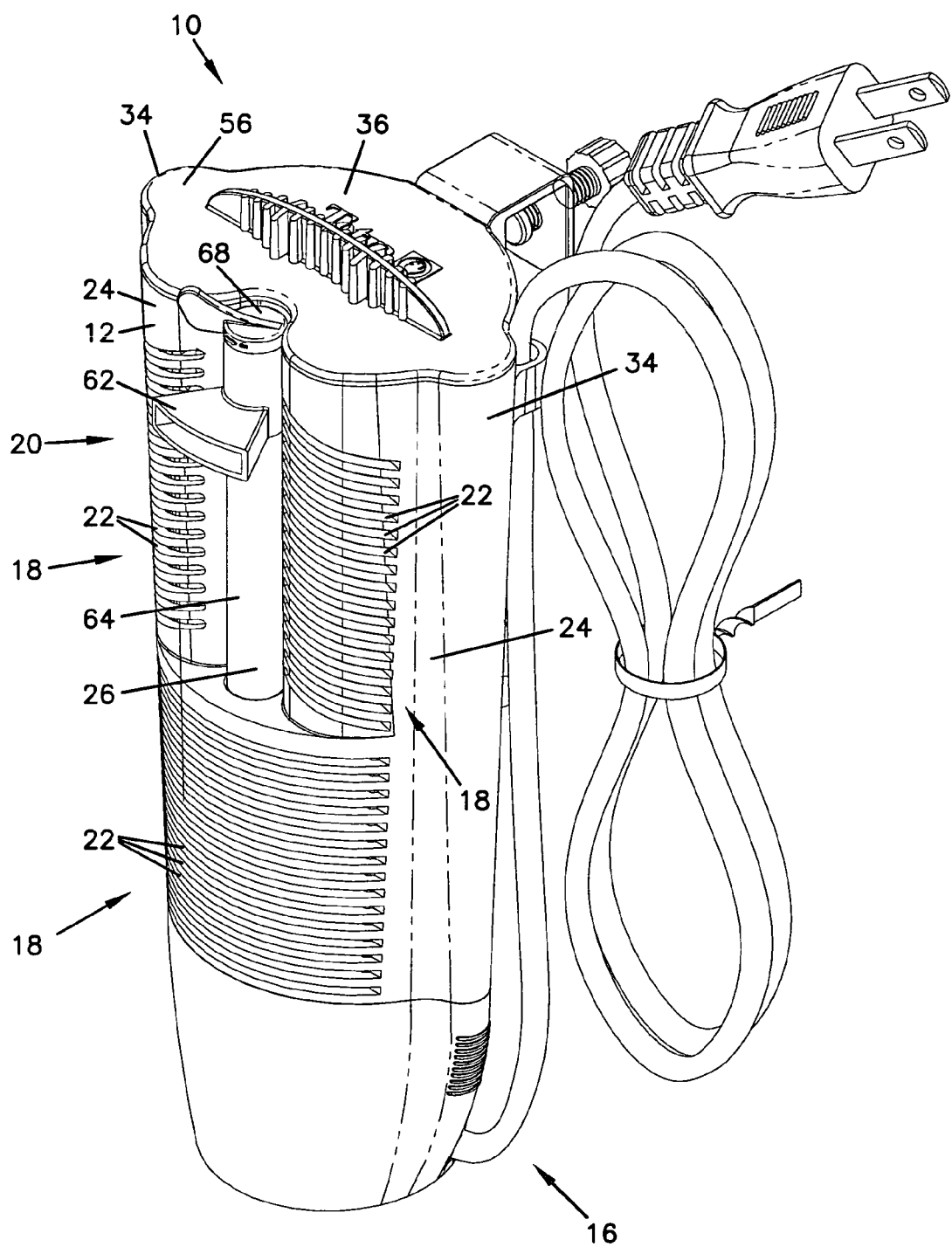
FIG. 1 is a perspective view of one embodiment of a filter arrangement, according to the principles of the present disclosure.
Figure 2:
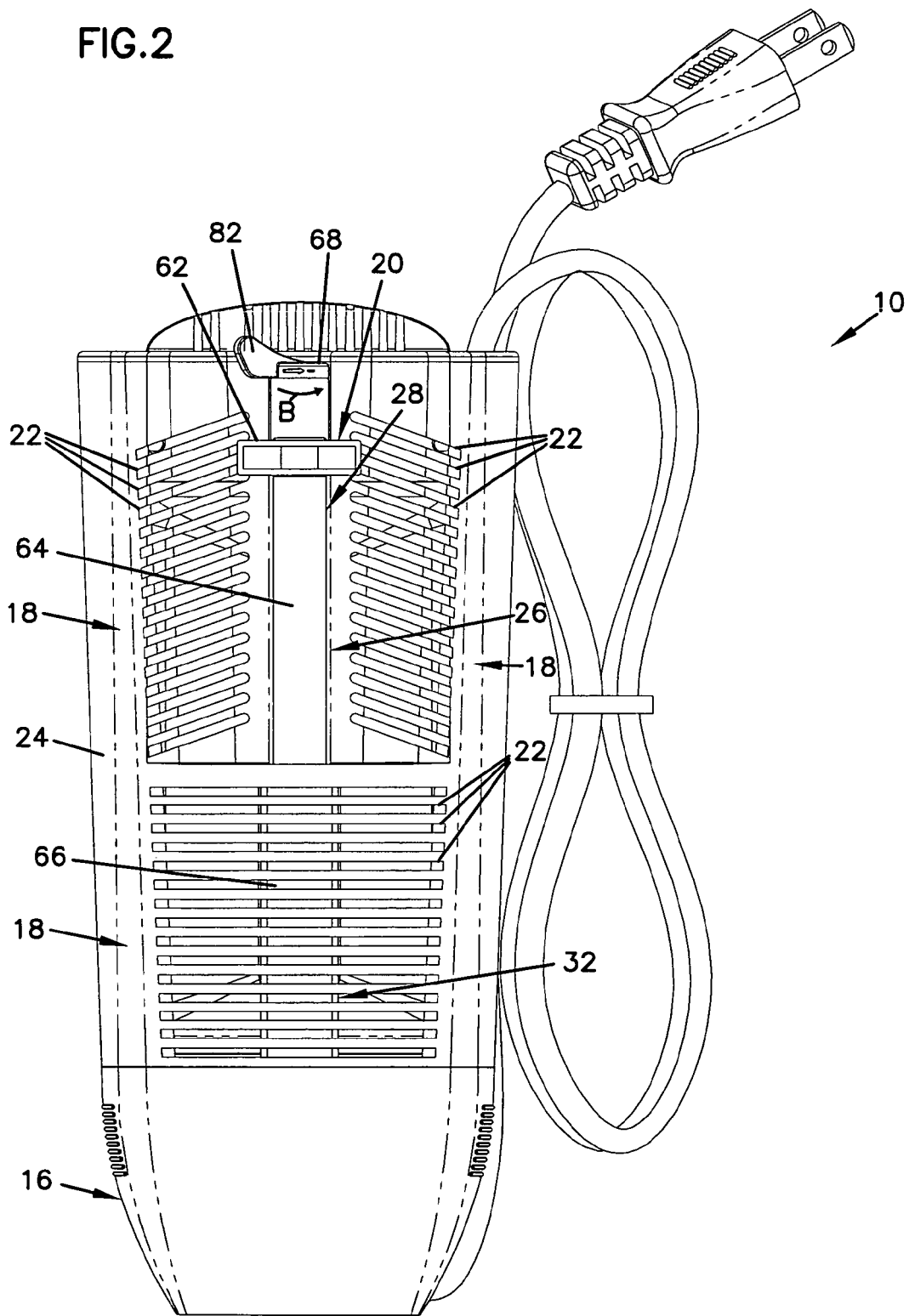
FIG. 2 is a front elevation view of the filter arrangement of FIG. 1.
Figure 3:
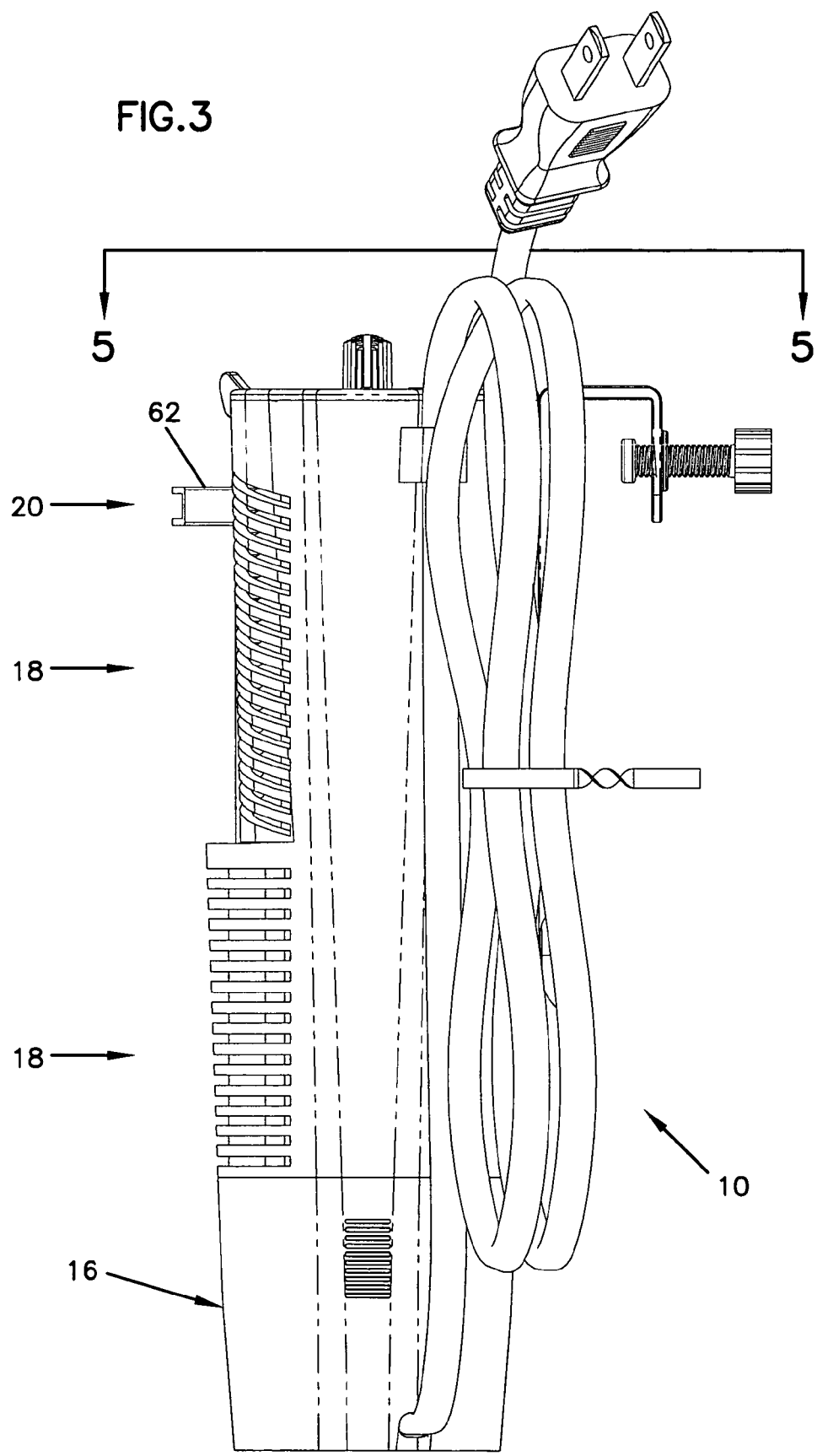
FIG. 3 is a side elevation view of the filter arrangement of FIG. 1.

As shown in FIGS. 1 and 2, the filter housing 12 includes an inlet 18 through which water is drawn by the pump assembly 16, and an outlet 20 from which water is dispensed back into the aquarium 100. In the illustrated embodiment, the inlet 18 is defined by a number of openings 22, such as slots, formed in a sidewall 24 of the filter housing 12. The outlet 20 is defined by a diffuser 62 located at a first end 28 (FIG. 2) of an outlet tube 26. The inlet and outlet 18, 20 of the filter arrangement 10 can include other structural configurations and arrangements. For example, the inlet can include a separate inlet tube or a single inlet opening, and/or the outlet can include a grated or slotted outlet formed in the housing.

A flow control valve 68 can be provided to control the flow rate of the water through the filter arrangement 10. The valve 68 is positionable in an open position, as shown in FIG. 5, or any one of a number of restriction positions. In the open position, water flows through the outlet 20 without restriction. As a lever 82 of the valve 68 is turned to the right (see arrow B in FIG. 2), a restrictor body 84 (FIG. 4) moves or thread downward to restrict flow through the outlet 20, and thereby controls the flow rate through the filter arrangement 10.

Referring now to FIG. 5, the outlet tube 26 has a second end 32 located adjacent to a bottom 30 of the filter housing 12. In one embodiment, the outlet tube 26 of the outlet 20 includes first and second tubular sections 64, 66. As shown in FIG. 4, the first section 64 is separable from the filter housing 12. The first section 64 defines the first end 28 of the outlet tube 26 that interconnects to the diffuser 62. In the illustrated arrangement 10, a portion of the first section 64 (FIG. 1) of the outlet tube 26 is located at the exterior of the filter housing 12.

Still referring to FIG. 5, the second tubular section 66 of the outlet tube 26 is located within the filter housing 12. The second section 66 defines the second end 32 of the outlet tube 26 located adjacent to the bottom 30 of the housing 12. In the illustrated embodiment, the second tubular section 66 is formed integral with the filter housing 12. As shown in FIG. 2, the openings 22 of the inlet 18 are located on either side of and adjacent to the second tubular section 66. It is contemplated that each of the first and second tubular sections 64, 66 can be constructed as separate sections, located either outside or within the housing, or formed as an integral section.

The first and second sections 64, 66 of the tube outlet 26 are interconnected and provide fluid communication between the pump assembly 16 and the aquarium 100. Preferably, the first section 64 moves in a sliding motion relative to the second section 66 so that the height of the outlet 20 (e.g., the diffuser 62) can be adjusted relative to the water level WL (FIG. 6) within the tank 100. For example, the outlet 20 can be adjust to dispense filtered water through the diffuser 62 at a location below the water level WL of the aquarium, at the water level WL of the aquarium, or above the water level WL for a waterfall effect.

The filter cartridge 14 of the disclosed filter arrangement 10 is preferably a removable filter cartridge 14. The filter cartridge 14 includes a frame 38 (FIG. 5), a handle 40, and filter media 42 secured to the frame 38. Further details of an example filter cartridge that can be used with the disclosed filter arrangement are described in U.S. Pat. No. 6,692,637, the disclosure of which is hereby incorporated by reference.

Referring back to FIG. 1, the illustrated filter housing 12 includes channels 34 that retain the filter cartridge 14 in a substantially vertical orientation within the housing 12. In particular, side edges defining a longitudinal dimension of the filter cartridge 14 are configured to simply slide within the channels 34 to seat the filter cartridge 14 within the filter housing 12 (see FIG. 4). The construction of the channels 34 and the size of the filter cartridge 14 are such that flow around the side edges of the filter cartridge is minimized to enhance filtration efficiency. Flow around the side edges is minimized even during extended use of a clogged filter cartridge.

Figure 7:
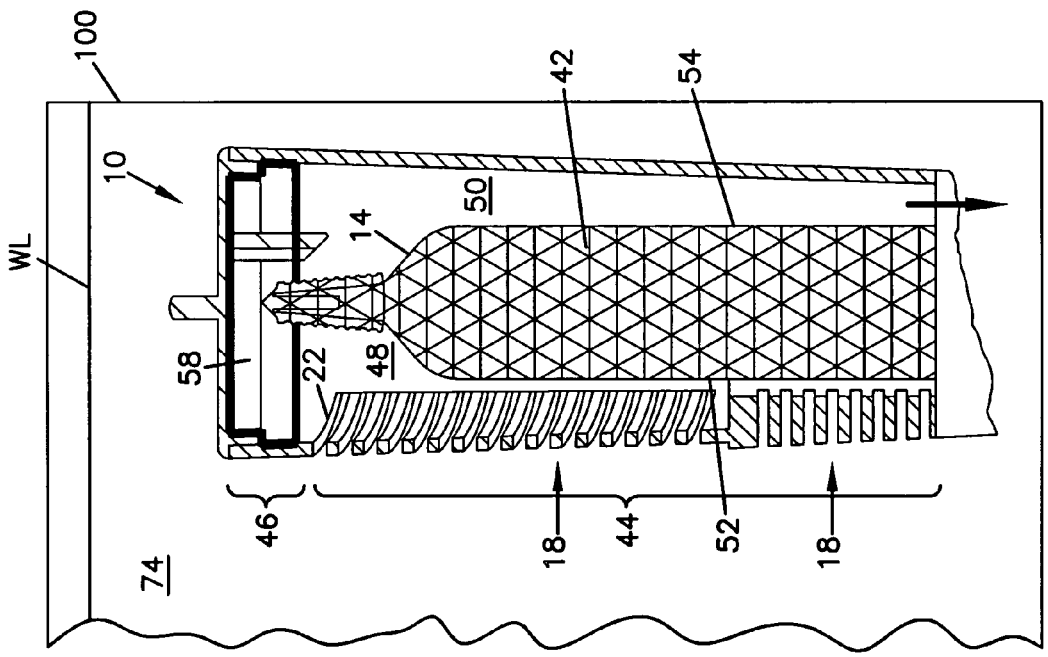
FIG. 7 is a schematic representation of the filter arrangement of FIG. 6, showing operation of the filter arrangement with a clogged filter cartridge.

Referring now to FIGS. 6 and 7, the filter housing 12 of the filter arrangement 10 generally has a first region 44 and a second region 46. When positioned within the filter housing 12, the filter media 42 of the filter cartridge 14 is located primarily in the first region 44. In the illustrated embodiment of FIGS. 6 and 7, the first region 44 is a lower region and the second region 46 is an upper region located above the first lower region 44. While referred to as upper and lower regions, it will be appreciated, as further described hereinafter, that the orientation of the first and second regions is not limited to upper and lower. Rather, the terms upper and lower are used for explanatory purposes of the illustrated embodiment.

Still referring to FIG. 6, the inlet 18 of the filter arrangement 10 is located below the second upper region 46 of the filter housing. That is, the uppermost opening 22 in the sidewall 24 of the filter housing is located within the first lower region 44.

The first lower region 44 can be referred to as a filtration region. The filter cartridge 14 is positioned within the filtration region during use. The filter cartridge divides the filtration region 44 into two chambers: an intake chamber 48 and a discharge chamber 50. An upstream side 52 of the filter cartridge is located at the intake chamber 48 and a downstream side 56 of the filter cartridge is located at the discharge chamber 50. During normal operation, water is drawn through the inlet 18 of the filter housing 12 and into the intake chamber 48. The water then passes through the upstream and downstream sides 52, 54 of the filter cartridge 14 and into the discharge chamber 50.

The pump assembly 16 draws the filtered water from the discharge chamber 50 through an opening 60 (FIG. 5) formed in the bottom 30 of the filter housing 12. The water then flows to the second end 32 of the outlet tube 26 and is dispensed back into the aquarium 100. Referring to FIG. 4, a volute-like channel 92 provides fluid communication between the opening 60 at the discharge chamber 50 and the second end 32 of the outlet tube 26. In the illustrated embodiment, the channel 92 is formed integral with the pump housing 90.

In one method of use, the filter arrangement 10 is mounted within the aquarium 100 such that the second upper region 46 of the filter housing 12 is located below the water level WL of the aquarium. Mounting elements 70 (FIG. 4), such as suction components 72 (one shown in a bag), are provided to mount the filter housing 12 directly to an inner sidewall 74 (FIG. 6) of the aquarium 100. In employing this method of use, other mounting configurations, such as mounting the filter arrangement 10 to a bottom surface of the aquarium, or use of other mounting structures, for example, are contemplated. As shown in FIGS. 6 and 7, when the filter housing 12 is mounted with the second region 46 located below the water level WL of the aquarium 100, at least the inlet 18 is completely submerged, i.e., located completely below the water level WL of the aquarium 100.

When the second region 46 of the filter housing 12 is positioned below the water level WL of the aquarium 100, the second region 46 functions as a bypass region. The bypass region provides a bypass pathway for aquarium water. The bypass pathway provides sufficient water flow through the filter housing 12 when the filter cartridge 14 is dirty or clogged. In extended use of a clogged filter, the bypass pathway prevents strain and premature wear on the pump assembly 16 that can be caused by insufficient water flow through the pump assembly. The bypass feature of the present disclosure also provides for continued water circulation within the aquarium during extended use so as to comparably provide improved water quality, as opposed to a complete filter blockage.

The bypass region 46 is preferably sealed when used in the submersed filter application of FIGS. 6 and 7. What is meant by sealed is that a top 36 (FIGS. 1 and 4) of the filter housing 12 is closed and capable of containing a fluid, such as air. The top 36 can be an integral construction with the sidewall 24 of the filter housing 12 to provide an "air-tight" bypass region, or can be a separate construction capable of containing a fluid. In the illustrated embodiment, the top 36 is a separate cap piece 56. The cap piece 56 can be sealed in relation to the sidewall of the filter housing 12 by an o-ring arrangement, or an adhesive and/or hermetic bond. In the illustrated embodiment, the bypass region 46 is sealed by a tight friction or interference fit (see FIG. 5) between the cap piece 56 and the sidewall 24 of the filter housing 12.

Referring back to FIG. 6, in use, the bypass region 46 contains a volume of a secondary fluid 58 (outlined in heavy line). Preferably, the secondary fluid 58 has a specific gravity that is different than the specific gravity of the primary fluid being filtered, e.g., the aquarium water. Typically, the secondary fluid 58 is air that has been trapped within the bypass region 46 by proper placement of the filter arrangement 10 in the aquarium 100. In normal operation when the filter cartridge 14 is not clogged, the primary fluid (e.g., aquarium water) flows relatively easily through the filter cartridge 14. Accordingly, the pressure differential between the intake chamber 48 and the discharge chamber 50 is minimal.

Referring to FIG. 7, when the filter cartridge 14 becomes clogged, however, the pump assembly 16 lowers the pressure within the discharge chamber 50. The pressure differential between the intake and discharge chambers 48, 50 then increases. The bypass region 46 experiences the pressure differential of the intake and discharge chambers. The higher pressure located in the intake chamber 48 causes a portion of the volume of the secondary fluid 58 to migrate toward the discharge chamber 50.

The water flows through the bypass region when a pressure at the downstream side of the filter cartridge 14 is at a pressure sufficiently lower than a pressure at the upstream side of the filter cartridge. That is, as the pressure differential increases, a greater portion of the secondary fluid 58 migrates toward the discharge chamber 48. Eventually, due to the migration of a sufficient portion of the volume of the secondary fluid 58, the primary fluid reaches a height where the primary fluid overflows or spills over the handle 40 of the filter cartridge 14.

In some conventional arrangements, bypass occurs around the edges, for example, of a filter cartridge. In these arrangements, however, the "looser" fit between the filter cartridge and the filter housing can permit dirty water to continuously bypass the filter cartridge, even when the filter cartridge is not clogged. The looser fit in such arrangements reduces the filtration efficiency of the device. In other conventional arrangements, a spring-loaded device is used to provide a fluid bypass in the event of a filter clog. The spring-loaded device includes a number of components and structures arranged and assembled to permit water bypass in reaction to a pressure differential. The bypass pathway of the present filter arrangement eliminates costs and assembly and manufacturing complexity associated with the additional mechanical components of conventional arrangements, while still providing an arrangement with enhanced filtration efficiency.

In the illustrated method of use of FIGS. 6 and 7, use of the bypass pathway is permitted only when the filter media 42 of the filter cartridge 14 is clogged or blocked. The differing specific gravity of the secondary fluid 58, in combination with the structural arrangement of the first and second regions 44, 46 of the filter housing, and the filter cartridge 14, control bypass flow. Specifically, clogged filter media 42 (FIG. 7) causes a pressure differential by creating a higher pressure at the upstream side 52 of the filter cartridge 14 due to resistance of flow through the clogged filter cartridge 14 and the head pressure from the aquarium water. That is, because the filter arrangement 10 is submerged such that the water level WL of the aquarium 100 is above the bypass region 44 of the filter housing 12, pressure in the intake chamber 48 remains at a point equivalent to the head pressure of the aquarium, while the pump assembly lowers the pressure in the discharge chamber 50; thereby creating a pressure differential.

As the difference in pressure increases due to operation of the pump assembly, the primary fluid within the intake chamber 48 rises and the secondary fluid 58 is forced to migrate or change locations. At a point, the pressure gradient becomes sufficient enough to displace a majority of the volume of the secondary into the discharge chamber 50 and allow the primary fluid to bypass the filter media 42. The primary fluid bypasses the filter media 42 by flowing over the filter cartridge 14 and into the discharge chamber 50.

As previously discussed, the secondary fluid 58 can include a volume of air. In some aquarium arrangements, the air molecules of the secondary fluid 58 can be absorbed by aquarium water having a lesser-dissolved oxygen content. An air stone can be used in combination with the disclosed filter arrangement 10 to increase the dissolved oxygen content of the water, and thereby reduce the rate of air molecule absorption. In use with an air stone, the reduction of air volume due to absorption is typically not a problem, as filter replacement usually occurs prior to the occurrence of a significant reduction in air volume. As can be understood, during filter replacement, the filter housing 12 is removed from the water to access the filter cartridge 14. Replacing the filter cartridge 14 accordingly replenishes the volume of air (i.e., the secondary fluid 58) contained within the bypass region 46 of the filter housing 12.

Figure 8:
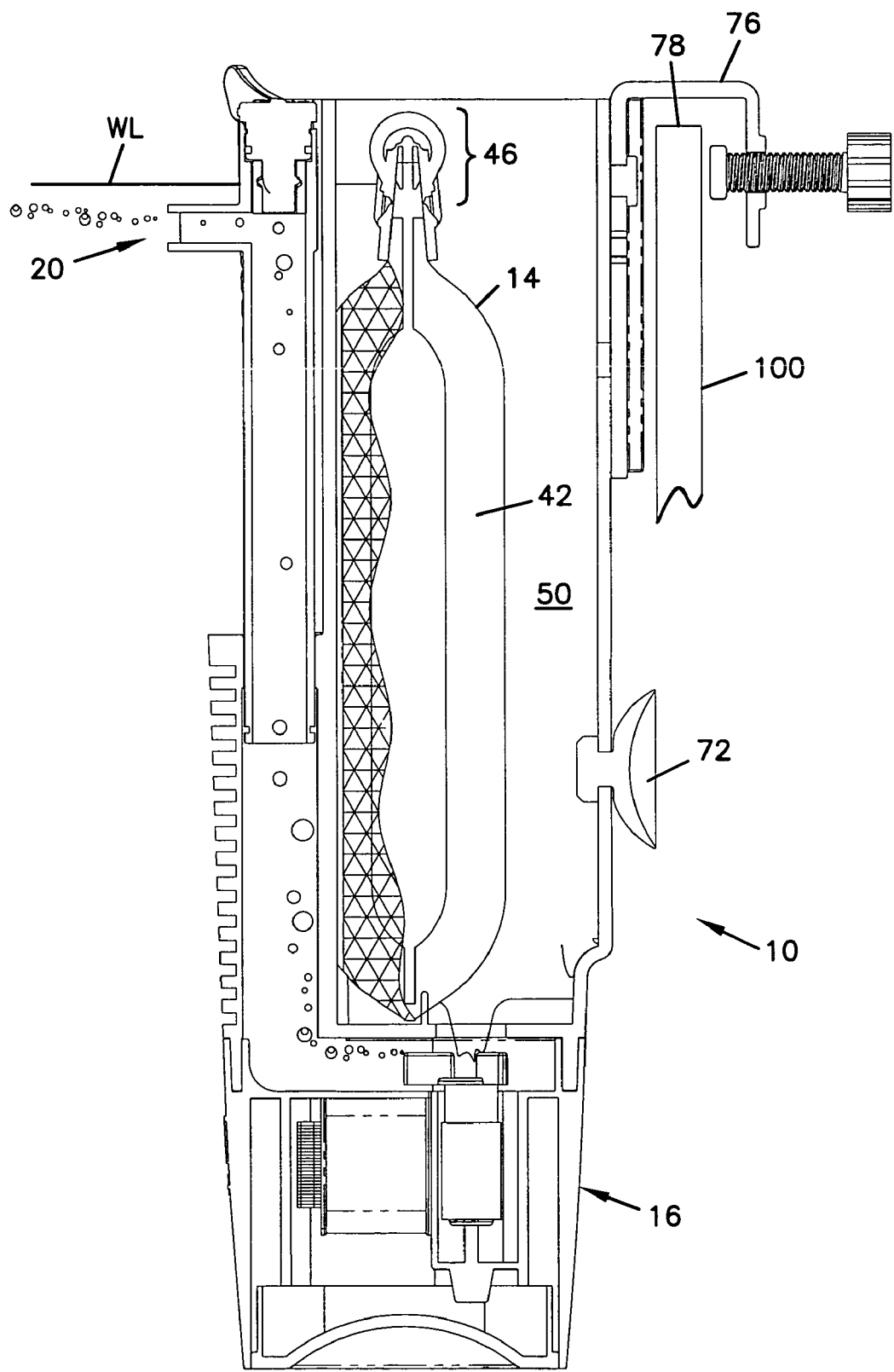
FIG. 8 is a schematic representation of the filter arrangement of FIG. 1, showing operation of the filter arrangement with a clogged filter cartridge in another method of use.

In another method of use, the filter arrangement 10 is mounted within the aquarium 100 such that at least a portion of the second upper region 46 of the filter housing 12 is located above the water level WL of the aquarium. In this method, as shown in FIG. 8, the mounting elements 70, including a bracket 76 and one or more of the suction components 72, are used to mount the filter housing 12 to a top edge 78 of the aquarium 100. In employing this method of use, other mounting configurations or use of other mounting structures are contemplated. When the filter housing 12 is mounted with at least a portion of the second region 46 located above the water level WL of the aquarium 100, the filter arrangement 10 may or may not have a cover or cap piece (see Ref. No. 56 in FIG. 5, for example). Preferably, however, the second upper region 46 is vented to atmosphere. For example, the top 36 of the filter housing 12 may be open, or the filter housing 12 may have a sealed cap but mounted such that at least one of the slots 22 of the inlet 18 is located above the water level WL of the aquarium 100. Also, preferably, at least the outlet 20 is completely submerged, i.e., located completely below the water level of the aquarium 100, as shown in FIG. 8.

In particular, when mounted as described in reference to FIG. 8, the filter arrangement 10 emits a stream of bubbles when the filter media 42 becomes sufficiently clogged, indicating that replacement of the filter media 42 and/or filter cartridge 14 is required. Specifically, when the filter cartridge 14 becomes clogged, the pump assembly 16 draws and discharges all the water from the discharge chamber 50 into the aquarium 100. As the pump assembly 16 evacuates the water in the discharge chamber 50, a backpressure builds such that water is drawn into the pump assembly 16 through the outlet 20. Drawing water through the outlet 20 aids in preventing the pump assembly from overheating during extended use of the clogged filter cartridge 14. At the same time, air from the empty discharge chamber 50 is intermixed with the water in the pump assembly. The air rises through the outlet tube 26 and is discharged into the aquarium 100. Due to the significant pressure differential created while evacuating the discharge chamber, some water can be drawn through the filter media 42, even though clogged. The flow rate of water through the clogged filter media 42, however, is far less than the flow rate of the pump.

Because the second upper region 46 is located above the water level WL of the aquarium, the water within the filter housing will not flow through the bypass region 46. That is, the water level within the filter housing 12 will not exceed the water level within the aquarium. Accordingly, the pump assembly 16 continues to discharge air through the filter arrangement outlet 20 during extended use of the clogged filter cartridge 14.

Still referring the FIG. 8, the outlet 20 is located below the water level WL. As air exits the outlet 20, the air rises to the water surface in the form of bubbles. The bubbles provide both an audible and visual indication that the filer media 42 of the filter cartridge 14 is clogged. In conventional arrangements, a user is required to physically inspect the filter cartridge to determine if the filter media requires replacement and/or maintenance. Physically inspecting a filter cartridge typically hidden from view is often forgotten. In this arrangement, the user is alerted when maintenance is needed by readily perceivable audible and visual cues.

Referring now to FIGS. 9 and 10, an alternative embodiment of a filter arrangement 210 is schematically represented. The principles of operation and the structural make up of the filter arrangement 210 are similar to the principles previously described with respect to the first embodiment of FIGS. 1-8. In the filter arrangement 210, however, the bypass region and the filtration region are inverted.

In particular, the filter arrangement 210 includes a filter housing 212 and a filter cartridge 214 positionable within the filter housing 212. The filter housing 212 generally defines a first region 244 and a second region 246. When positioned within the filter housing 212, filter media 242 of the filter cartridge 214 is located primarily in the first region 244. In the illustrated embodiment of FIGS. 9 and 10, the first region 244 is an upper region and the second region 246 is a lower region located below the first upper region 244. The upper and lower regions 244, 246 are generally sealed the by construction of the filter housing 212 and/or other seals, such as an o-ring 280, for example.

Referring to FIG. 9, the first upper region 244 can be referred to as a filtration region. The filter cartridge 214 is positioned within the filtration region during use. The filter cartridge divides the filtration region 244 into two chambers: an intake chamber 248 and a discharge chamber 250. During normal operation, water is drawn through an inlet 218 of the filter housing 212 and into the intake chamber 248. The water then passes through the filter cartridge 214 and into the discharge chamber 250. From the discharge chamber 250, the filtered water is dispensed back into the aquarium 100 through an outlet 220 by a pump assembly 216.

In use, the second lower region 246 of the filter housing 212 provides a bypass pathway for aquarium water. In particular, the second region, or bypass region 246, contains a volume of a secondary fluid 258. In the embodiment shown, the second region 246 can comprise a well or reservoir-like region that that is closed and capable of containing a fluid (i.e., sealed). Preferably, the secondary fluid 258 of the alternative filter arrangement 210 has a specific gravity that is different than the specific gravity of the primary fluid being filtered, e.g., the aquarium water. More preferably, the secondary fluid 258 has a specific gravity that is sufficiently greater than the specific gravity of the primary fluid. In normal operation when the filter cartridge 14 is not clogged, the secondary fluid 258 remains with the second region 246 due the weight of the secondary fluid 258.

Referring now to FIG. 10, when the filter cartridge 214 becomes clogged, the pump assembly 216 lowers the pressure within the discharge chamber 250. The pressure differential between the intake and discharge chambers 248, 250 then increases. The bypass region 246 experiences the pressure differential of the intake and discharge chambers. The higher pressure located in the intake chamber 248 causes a portion of the volume of the secondary fluid 258 to migrate toward the discharge chamber 50.

At a point, the pressure gradient becomes sufficient enough to displace a majority of the volume of the secondary fluid 258 and allow the primary fluid to bypass the clogged filter media 242. In this embodiment, the primary fluid bypasses the filter media 242 by flowing under the filter cartridge 214 and into the discharge chamber 250.

FIGS. 1-9 illustrate embodiments of a filter arrangement having features adapted for improving an overall water quality in an aquarium during extended filter cartridge use. Other preferred features are adapted for accommodating ease of use by indicating to the user that filter cartridge maintenance is required. The above specification provides a complete description of the present invention. Since many embodiments of the invention can be made without departing from the spirit and scope of the invention, certain aspects of the invention reside in the claims hereinafter appended.

What is claimed is:

1. An aquarium arrangement, comprising;
   a) an aquarium containing aquarium water;
   b) a filter arrangement positioned within the aquarium, the filter arrangement having a fully submerged inlet and an outlet, the filter arrangement including:
      i) a filter housing having a filtration region and a bypass region;
      ii) a filter cartridge positionable within the filter housing, the filter cartridge including filter media located primarily within the filtration region when the filter cartridge is positioned within the filter housing; and
      iii) a volume of fluid located within the bypass region, the volume of fluid having a specific gravity different than that of the aquarium water flowing through the filter arrangement;
      iv) wherein the bypass region is sealed such that the volume of fluid is trapped within the filter arrangement during operation of the aquarium arrangement.

2. The aquarium arrangement of claim 1, wherein the bypass region is located above the filtration region.

3. The aquarium arrangement of claim 1, wherein the bypass region is located below the filtration region.

4. The aquarium arrangement of claim 1, wherein the filter arrangement further includes a submersible pump assembly interconnected to the filter housing.

5. The aquarium arrangement of claim 1, wherein the volume of fluid has a specific gravity that is less than the specific gravity of the aquarium water flowing through the filter arrangement.

6. The aquarium arrangement of claim 1, wherein water flows through the bypass region only when the filter cartridge becomes clogged.

7. The aquarium arrangement of claim 1, wherein the outlet of the filter arrangement is fully submerged.

8. The aquarium arrangement of claim 1, wherein water overflow through the bypass region of the filter housing, due to the filter cartridge becoming clogged, is controlled by migration of the volume of fluid, the migration resulting from a pressure differential between an upstream side and a downstream side of the clogged filter cartridge.

9. The aquarium arrangement of claim 1, wherein the volume of fluid is air, and wherein the bypass region is air-tight such that the air is contained within the bypass region.

10. The aquarium arrangement of claim 1, wherein the volume of fluid has a specific gravity that is greater than the specific gravity of the aquarium water flowing through the filter arrangement.

11. A filter arrangement for filtering a primary fluid, the filter arrangement comprising:
   a) a filter housing having an upper region and a lower region;
   b) a filter cartridge positionable within the filter housing, the filter cartridge having an upstream side and an opposite downstream side;
   c) a submersible pump assembly interconnected to the filter housing; and
   d) a bypass pathway located through one of the upper region and the lower region, the one region of the upper region and the lower region being sealed;
   e) wherein flow through the bypass pathway is controlled by migration of a secondary fluid located in the one of the upper and lower regions, the secondary fluid being trapped within the filter arrangement during filtering operation, the secondary fluid being different than the primary fluid that passes through the filter housing, the migration resulting from a pressure differential between the upstream and downstream sides of the filter cartridge.

12. The filter arrangement of claim 11, wherein the bypass pathway is located in the upper region of the filter housing.

13. The filter arrangement of claim 11, wherein the bypass pathway is located in the lower region of the filter housing.

14. The filter arrangement of claim 11, wherein the filter housing defines an inlet, the inlet being located below the bypass pathway.

15. The filter arrangement of claim 11, wherein the filter housing defines an inlet, the inlet being located above the bypass pathway.

16. The filter arrangement of claim 11, wherein the secondary fluid has a specific gravity that is less than the specific gravity of the primary fluid that passes through the filter housing during normal operation.

17. The aquarium arrangement of claim 16, wherein the secondary fluid is air, and wherein the one region is air-tight such that the air is contained within the one region.

18. The filter arrangement of claim 11, wherein the secondary fluid has a specific gravity that is greater than the specific gravity of the primary fluid that passes through the filter housing during normal operation.

19. An aquarium arrangement, comprising;
   a) an aquarium containing aquarium water; and
   b) a filter arrangement positioned within the aquarium, the filter arrangement having a fully submerged inlet and an outlet, the filter arrangement including:
      i) a filter housing having a filtration region and a sealed bypass region located above the filtration region;
      ii) a filter cartridge positionable within the filter housing, the filter cartridge including filter media located primarily within the filtration region when the filter cartridge is positioned within the filter housing; and
      iii) a volume of air that is captured within the sealed bypass region and that does not vent to atmosphere during operation of the aquarium arrangement;
      iv) wherein aquarium water overflows through the bypass region when the filter cartridge becomes clogged, the water overflow through the bypass region being controlled by migration of the volume of air, the migration resulting from a pressure differential between an upstream side and a downstream side of the clogged filter cartridge.

20. An aquarium arrangement, comprising;
   a) an aquarium containing aquarium water;
   b) a filter arrangement positioned within the aquarium, the filter arrangement having a fully submerged inlet and an outlet, the filter arrangement including:
      i) a filter housing having a filtration region and a bypass region located below the filtration region;
      ii) a filter cartridge positionable within the filter housing, the filter cartridge including filter media located primarily within the filtration region when the filter cartridge is positioned within the filter housing; and
      iii) a volume of fluid located within the bypass region, the volume of fluid having a specific gravity different than that of the aquarium water flowing through the filter arrangement.

21. An aquarium arrangement, comprising;
   a) an aquarium containing aquarium water;
   b) a filter arrangement positioned within the aquarium, the filter arrangement having a fully submerged inlet and a fully submerged outlet, the filter arrangement including:
      i) a filter housing having a filtration region and a bypass region;
      ii) a filter cartridge positionable within the filter housing, the filter cartridge including filter media located primarily within the filtration region when the filter cartridge is positioned within the filter housing; and
      iii) a volume of fluid located within the bypass region, the volume of fluid having a specific gravity different than that of the aquarium water flowing through the filter arrangement.

22. An aquarium arrangement, comprising;
   a) an aquarium containing aquarium water;
   b) a filter arrangement positioned within the aquarium, the filter arrangement having a fully submerged inlet and an outlet, the filter arrangement including:
      i) a filter housing having a filtration region and a bypass region;
      ii) a filter cartridge positionable within the filter housing, the filter cartridge including filter media located primarily within the filtration region when the filter cartridge is positioned within the filter housing; and
      iii) a volume of fluid located within the bypass region, the volume of fluid having a specific gravity that is greater than the specific gravity of the aquarium water flowing through the filter arrangement.

* * * * *